(12) United States Patent
Malik et al.

(10) Patent No.: US 7,119,572 B2
(45) Date of Patent: Oct. 10, 2006

(54) PROGRAMMABLE LOGIC DEVICE CONFIGURATION VIA DEVICE COMMUNICATION LINES

(75) Inventors: Vipin Malik, Houston, TX (US); Keith V. Groeschel, Houston, TX (US)

(73) Assignee: Daniel Industries, Inc., Houston, TX (US)

( * ) Notice: Subject to any disclaimer, the term of this patent is extended or adjusted under 35 U.S.C. 154(b) by 431 days.

(21) Appl. No.: 10/612,692

(22) Filed: Jul. 2, 2003

(65) Prior Publication Data

US 2005/0001652 A1     Jan. 6, 2005

(51) Int. Cl.
   *H03K 19/173*   (2006.01)
   *H04Q 9/00*     (2006.01)

(52) U.S. Cl. .............. 326/38; 340/539.13; 340/870.07; 340/825.69

(58) Field of Classification Search .................. 326/38, 326/40
   See application file for complete search history.

(56) References Cited

U.S. PATENT DOCUMENTS

| | | | |
|---|---|---|---|
| 5,887,165 A * | 3/1999 | Martel et al. ............... | 713/100 |
| 5,983,730 A | 11/1999 | Freund et al. ............. | 73/861.28 |
| 6,031,391 A * | 2/2000 | Couts-Martin et al. ....... | 326/38 |
| 6,326,806 B1 * | 12/2001 | Fallside et al. ............... | 326/38 |
| 6,494,105 B1 | 12/2002 | Gallagher ................. | 73/861.27 |
| 2003/0174070 A1 * | 9/2003 | Garrod et al. ......... | 340/870.07 |

* cited by examiner

*Primary Examiner*—Vibol Tan
(74) *Attorney, Agent, or Firm*—Conley Rose, P.C.

(57) ABSTRACT

A system is disclosed for performing measurements in a hazardous environment. In one embodiment the system comprises: a main device and a remote device having a programmable logic device (PLD). The main device is isolated from the hazardous environment, while the remote device is located within the hazardous environment. A cable is provided to transport at least one communication signal between the main device and the remote device, and the main device uses the communication signal to configure the PLD in the remote device. The remote device may also include a switch that passes the communication signal to a configuration terminal of the PLD before the PLD is configured, and that automatically blocks the communication signal from the configuration terminal after the PLD is configured. After the PLD is configured, the main device and PLD may both employ the communication signal to communicate in accordance with a predetermined communications protocol.

21 Claims, 2 Drawing Sheets

PROGRAMMABLE LOGIC DEVICE CONFIGURATION VIA DEVICE COMMUNICATION LINES

BACKGROUND

As used herein, the term programmable logic device (PLD) refers to any integrated circuit that can be configured to perform a customized function. This term encompasses programmable read-only memories (PROMs), programmable logic arrays (PLAs), programmable array logic (PAL), and field-programmable gate arrays (FPGAs). Of particular interest to the present disclosure are the FPGAs.

FPGAs are integrated circuits that include a configurable array of logic gates. A programmer can configure an FPGA to implement nearly any desired function of moderate complexity. Some examples of suitable functions include counters, multipliers, filters, and state machines. System designers often find FPGAs to be useful because the FPGAs can be programmed in the field to perform functions that are custom-tailored to the designers' needs. Many FPGAs are volatile, that is, they lose their configuration when power is removed. Volatile FPGAs consequently need to be reconfigured when the power is restored. The configuration of FPGAs typically occurs via dedicated configuration pins.

When designing electronics for hazardous environments, one of the primary design goals for system designers is to minimize energy that is provided to the electronic circuitry so as to avoid any possibility of a spark or a high-temperature surface that could ignite flammable vapors. Underwriters Laboratories has provided a safety standard for electronic circuits being used in hazardous locations. This is the UL 913 Standard for Intrinsically Safe Apparatus and Associated Apparatus, which is hereby incorporated by reference. Among the concepts described therein are energy barriers. An energy barrier is a circuit located outside of the hazardous area that limits the voltage and current provided to the intrinsically safe circuitry located inside the hazardous area. Energy barriers are typically voltage and current limiting, fuse-protected shunt-diode circuits; optical isolators; and/or galvanic isolators.

Sensors (e.g. flow meters) are often needed in hazardous areas. Because it is often impractical to make monitoring and measurement electronics intrinsically safe as a whole, the bulk of the monitoring and measurement electronics are typically located outside the hazardous area or within an explosion-proof container. Only the sensing portion of the electronics is located in the hazardous area, and is designed to be intrinsically safe. The sensing portion of the electronics preferably communicates with the bulk of the electronics via a cable and an energy barrier.

The sensing portion may be a desirable place to use a FPGA because this would allow a significant degree of flexibility. For example, an FPGA could offer the ability to implement multiple functions with a single chip, the ability to upgrade software in the field, and the ability to customize the software logic to different field conditions. However, using an FPGA in the sensing portion creates a challenge, namely, a method of configuring the FPGA is needed.

One configuration method would be to connect a memory device such as an EEPROM to the programming pins of the FPGA. This method undesirably increases the cost of the sensing portion electronics. A method is needed that does not significantly increase the cost of the system.

SUMMARY

Accordingly, there is disclosed herein a system for performing measurements in a hazardous environment using a field programmable device that is remotely configurable via a communication link that also serves to transfer data out of the hazardous area. In one embodiment the system comprises: a main device and a remote device having a programmable logic device. The main device is isolated from the hazardous environment, while the remote device is located within the hazardous environment. A cable is provided to transport at least one communication signal between the main device and the remote device, and the main device uses the communication signal to configure the programmable logic device in the remote device. The remote device may also include a means of switching the communication signal to a configuration terminal of the programmable logic device before the programmable logic device is configured, and that automatically blocks the communication signal from the configuration terminal after the programmable logic device is successfully configured. After the programmable logic device is configured, the main device and programmable logic device may both reemploy the communication signal to communicate in accordance with a predetermined communications protocol.

BRIEF DESCRIPTION OF THE DRAWINGS

A better understanding of exemplary embodiments of the present invention can be obtained when the following detailed description of the preferred embodiment is considered in conjunction with the following drawings, in which.

Figure 1:
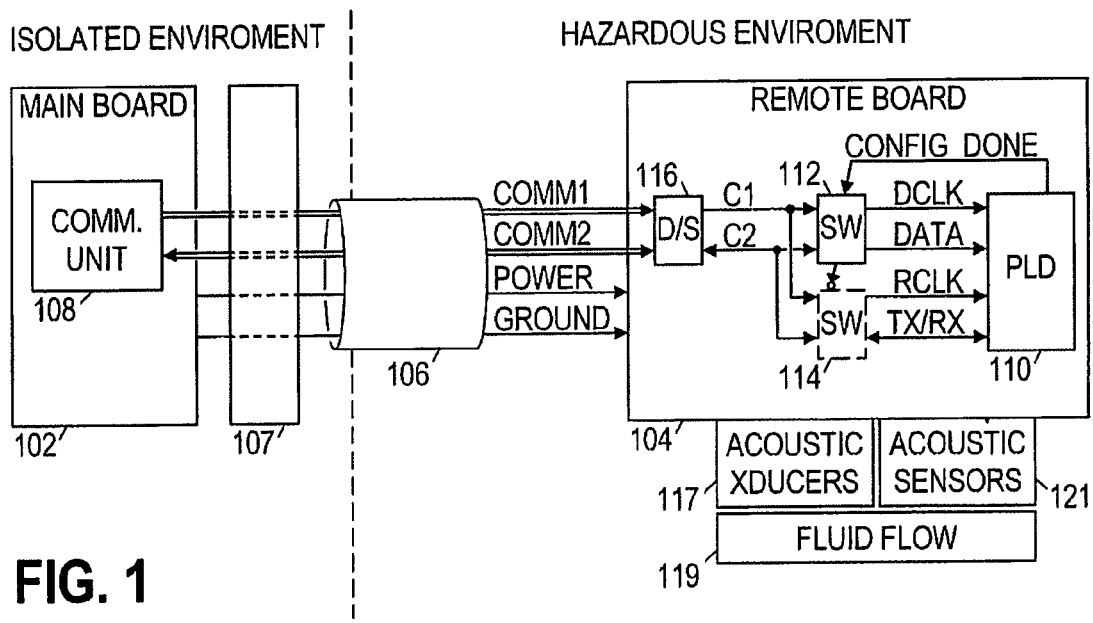
FIG. 1 is a block diagram of a monitoring and measurement system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Turning now to the figures, FIG. 1 shows a monitoring and measurement system having a main circuit board 102 in an isolated environment and a remote circuit board 104 in a hazardous environment. Generally, remote circuit board 104 may be referred to as the "sensing portion" of the system. The boards are preferably coupled by a cable 106 that transports power (POWER, GROUND) and at least one communication signal. A preferred embodiment transports two communication signals (COMM1, COMM2), each of which may be implemented as a differential signal pair. Accordingly, cable 106 is preferably a six-conductor cable. In alternative embodiments, a larger or smaller number of conductors may be used, and the communications signals may be non-differential. Alternatively, the communication signals may be transmitted via a wireless link.

The main board 102 provides power and the communication signals to the cable 106 via an energy barrier 107. A communications unit 108 on the main board 102 produces the communication signals in accordance with a predetermined communications protocol (e.g. RS232, RS485, or a synchronous protocol). The communications unit 108 may be a field-programmable gate array (FPGA) that is customized to configure the operation of the remote board 104 and to gather sensor data from the remote board. The sensor data may then be communicated to control electronics (not shown) on the main board 102. The bulk of the data processing and storage may be performed by main board 102, where providing the necessary complexity is significantly less expensive.

The communications unit 108 preferably transmits and receives communications signals to and from the remote board 104. One of the communications signals may be a clock signal. (In a preferred embodiment, the clock signal is provided by main board 102.) A second communication signal may be an exchange of commands (from the main board 102), measurement data (from the remote board 104) and status information (also from the remote board). As explained further below, during an initial set-up phase the conductors for this second communication signal are preferably used to transport configuration information to the remote board 104.

The remote board 104 preferably includes a programmable logic device (PLD) 110, one or more switches 112, 114, and a signal conditioner 116. PLD 110 may take the form of an FPGA that implements multiple functions such as, e.g., firing transducers, acquiring sensor data, performing status monitoring, and buffering data. The multiple functions may also include a communication state machine that complies with the predetermined communications protocol.

Signal conditioner 116 converts between differential-pair and single polarity signals. Thus differential communication signals COMM1 and COMM2 may become single polarity signals C1 and C2. Signal conditioner 116 may additionally provide noise filtering and amplification of the signals. The signals may be amplified enough to "digitize them", i.e., enough to cause the signals to saturate at the digital rails.

Switch 112 and optional switch 114 may be signal-controlled electrical/electronic switches or multiplexers. Switch 112 and optional switch 114 operate to alter the path of the communication signals on remote board 104. Initially switch 112 is closed and switch 114 (if present) is open. This configuration couples the communication signals C1 and C2 to the configuration pins of PLD 110. The configuration pins of PLD 110 may include a configuration data input (DATA) and a clock for the configuration data (DCLK). The main board 102 may transmit configuration data to configure the PLD 110 while the remote board is in this initial state. Once the PLD 110 is configured, the PLD may assert a configuration done (CONFIG_DONE) signal.

Once the configuration is complete, remote board 104 may perform normal operations, e.g., data acquisition and telemetry communications with the main board 102. The assertion of the configuration done signal preferably causes switch 112 to open and switch 114 to close. This configuration couples the communication signals to pins of the PLD that have been configured to operate in accordance with the communications protocol. For example, one communications protocol preferably provides for a reference clock signal (RCLK) provided by the main board 102, and a bi-directional transmit/receive signal (TX/RX). In alternative embodiments, the clock signal may be provided by the transmitting board. In such embodiments, the remote board 104 transmits RCLK while transmitting on TX/RX, and receives RCLK while receiving on TX/RX.

Switch 114 may be omitted in those embodiments having a PLD that is unaffected by activity on the communication pins during configuration of the PLD. It may be possible to structure the configuration process in such a manner as to deliberately achieve this effect. In alternative embodiments where multiple PLD's may be cascaded and programmed serially, the communications lines may be switched over to their communication function only after all logic devices in the chain are programmed successfully.

It should be recognized that while transportation of two communication signals (COMM1, COMM2) are preferred between main board 102 and remote board 104, alternative embodiments may use a single bi-directional communication signal. Certain communications protocols provide for the embedding of clock information into a data signal. This may reduce material costs with only a slight increase in the complexity of the electronics.

FIG. 1 demonstrated a technique for remote configuration of a PLD. This technique can be leveraged to configure multiple PLDs on a remote board.

Figure 2:
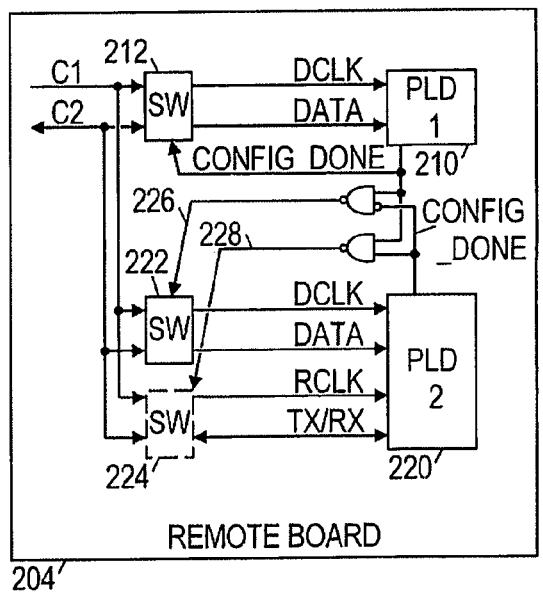
FIG. 2 is a block diagram of an alternative embodiment of the sensing portion.

FIG. 2 shows an embodiment of a remote board 204 having multiple PLDs. Remote board 204 comprises a first PLD 210 and a second PLD 220. Communications with the main board 102 are preferably transported by communication signals C1 and C2. The path of communication signals C1 and C2 is preferably controlled by a switch arrangement including switches 212, 222, and optional switch 224.

Either or both of PLDs 210 and 220 may be an FPGA. PLD 210 may perform multiple functions such as transducer firing, data acquisition and/or signal processing. PLD 220 may also perform multiple functions such as control and communications. In alternative embodiments, one or more of the PLDs may be a FLASH memory or EEPROM.

Initially, switch 212 is closed while switches 222 and 224 (if present) are open. This configuration couples the communication signals to the configuration data input and configuration clock input of PLD 210. In this state the main board 102 can transmit configuration data to configure PLD 210. Once PLD 210 is configured, it asserts a configuration done signal. PLD 210 is now ready for normal operations, while PLD 220 is not.

The assertion of the configuration done signal by PLD 210 causes switch 212 to open and switch 222 to close. If present, optional switch 224 remains open. This configuration couples the communications signals to the configuration data input and configuration clock input of PLD 220. While the remote board 104 is in this state, the main board 102 can transmit configuration data to configure PLD 220. Once PLD 220 is configured, it asserts its own configuration done signal. Both PLDs 210 and 220 are now ready for normal operations.

The assertion of the configuration done signal by PLD 220 causes switch 222 to open and optional switch 224 to close. This configuration couples the communications signals to the pins of PLD 220 (or PLD 210) that have been configured to operate in accordance with the communications protocol. The remote board 104 may then commence normal operations.

As shown in FIG. 2, digital logic may be provided to cause the switches to open and close in response to the appropriate combinations of asserted configuration done signals. The control signal for switch 222 may be formed using a "NAND" logic gate that combines the configuration done signal from PLD 210 with an inverted configuration done signal from PLD 220. If needed, the control signal for switch 224 may be formed using a "NAND" logic gate that combines the un-inverted configuration done signals from both PLDs 210 and 220.

As is apparent, the difference between the embodiments of FIGS. 1 and 2 is an additional PLD. The presence of more than one PLD may be desirable when more complex operations are performed. For example, having at least two PLDs may allow data to be received and processed by different PLDs. By receiving and processing the data separately, the data may be made readily available in both raw and processed form. This may be useful if there is a need for the raw data in addition to the processed data, or in cases where it is desirable to verify that the data is processed correctly. In other cases, only the processed data may desired.

Figure 3:
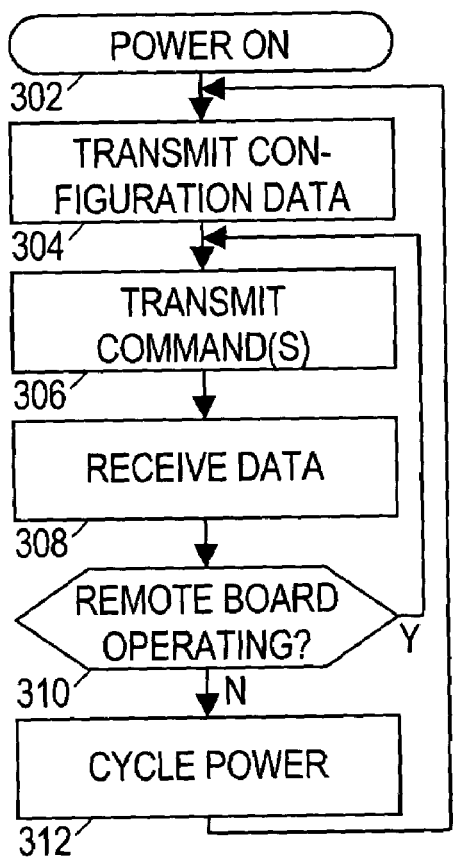
FIGS. 3 and 4 are flowcharts of a communication process in the monitoring and measurement system.
Figure 4:
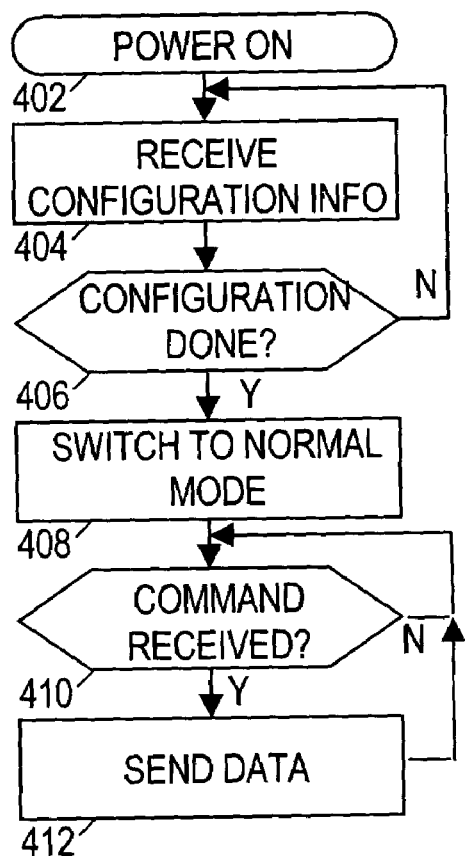

Referring now to FIGS. 3 and 4, flowcharts of a remote board configuration and communication process are shown. FIG. 3 illustrates the operation of main board 102 and FIG. 4 illustrates the operation of remote board 104.

Initially, main board 102 is powered on as indicated by block 302. At this time the main board may also provide power to the remote board (block 402) and may send a command to switch the remote board into configuration mode. In block 304, communications unit 108 produces the configuration data and transmits the configuration data to remote board 104. In block 404, remote board 104 receives the configuration data, and performs a configuration done check in block 406. The configuration process continues until configuration is complete, at which point remote board 104 switches to normal mode (block 408).

With the remote board in a normal operating mode, main board 102 transmits one or more commands to remote board 104, as indicated by block 306. Remote board 104 waits in block 410 for commands from the main board. While waiting, the remote board may be performing other tasks, e.g., transducer firing, data acquisition and signal processing. When a command (e.g., send data) is received, the remote board may respond by sending data in block 412 to the main board.

In block 308 the main board may receive data from the remote board. In block 310 the main board verifies that the remote board is operating as expected. This verification may take the form of determining that data was received in response to a request, that the communication signal was appropriately formatted, and that the data is within a valid range. If the data includes or takes the form of a status field, the field may include flags indicating whether the remote board is operating properly. As long as the remote board is operating properly, the main board may continue transmitting commands, receiving responses, and verifying proper operation in blocks 306, 308 and 310, respectively. The remote board may continue receiving commands and sending responses in blocks 410 and 412.

If the main board determines that the remote board is not operating properly, in block 312 the main board may reset the remote board by cycling the power off and on again. This power cycling may cause the remote board to reset, starting again from block 402. Alternatively, the main board may send out a predetermined command to the remote board to force the configuration switches (e.g., 212, 214) to the configuration setting without having to power cycle the remote board. The main board may then resend configuration information as done previously in block 304.

As described above, remote board 104 can be used to perform a variety of functions. One contemplated use for remote board 104 is in the field acoustic measurements, more specifically for measuring the time of flight of a signal. U.S. Pat. No. 5,983,730, incorporated by reference herein, describes a method for measuring the time of flight of a signal, which may be desirable to be used in accordance with the present invention. By knowing the time of flight of a signal, additional information, such as the velocity of a fluid can be derived (see U.S. Pat. No. 6,494,105, incorporated herein by reference).

For example, when used in accordance with the method of U.S. Pat. No. 5,983,730, the isolated environment where main board 102 resides may comprise a computer located in a control room or off-site (e.g., in a laboratory). The hazardous environment where remote board 104 resides may comprise a flow meter housing attached to a pipeline. The remote board 104 may be coupled to transducers 117 to emit ultrasonic impulses (or other forms of measurement energy) into a fluid flow 119 and sensors 121 to measure characteristics of or responses to the ultrasonic impulses. The PLD 110 may systematically trigger the transducers in a programmable fashion and gather the resulting sensor data. The sensor data may then be processed and stored for retrieval by main board 102. For complex processing and/or communications protocols, additional PLDs may be incorporated onto remote board 104 to provide additional programmable computing power.

While preferred embodiments of this invention have been shown and described, modification thereof can be made by one skilled in the art without departing from the spirit or teaching of this invention. The embodiments described herein are exemplary only and are not limiting. Many variations and modifications of the methods and apparatus are possible and are within the scope of this invention. For example, any number of FPGAs with any configuration setup may be used in accordance with the present invention. Accordingly, the scope of protection is not limited to the embodiments described herein, but is only limited by the claims, the scope of which shall include all equivalents of the subject matter of the claims.

What is claimed is:

1. A remote sensing device that comprises:
   a communications unit that sends a communication signal via an energy barrier into a hazardous environment;
   a programmable logic device in the hazardous environment that receives a configuration signal; and
   a switch configurable to pass the communication signal to the programmable logic device as the configuration signal,
   wherein the switch is configured to automatically block the configuration signal after the programmable logic device has been configured.

2. The device of claim 1, wherein the switch is at least partially controlled by a signal provided by the programmable logic device to indicate when the programmable logic device has been configured.

3. The device of claim 1, further comprising:
   a second programmable logic device configured to receive a configuration signal; and
   a second switch configurable to pass the communication signal to the programmable logic device as a configuration signal,
   wherein the second switch is configured to automatically block the configuration signal after the second programmable logic device has been configured.

4. The device of claim 3, wherein the second switch is further configured to block the configuration signal to the second programmable logic device until after the first programmable logic device has been configured.

5. The device of claim 1, wherein the programmable logic device is a field programmable gate array.

6. The device of claim 1, wherein after the programmable logic device has been configured, the programmable logic device receives the communication signal as a command signal.

7. The device of claim 1, wherein after the programmable logic device has been configured, the programmable logic device transmits responses to the command signal.

8. The device of claim 1, wherein after the programmable logic device has been configured, the programmable logic device communicates with main device using a programmed communications protocol.

9. The device of claim 1, after the programmable logic device has been configured, the programmable logic device fires acoustic transducers and gathers sensor measurements to determine characteristics of a fluid flow.

10. A method of operating a remote device in a hazardous environment, the method comprising:
    providing a path for a communication signal from an energy barrier to one or more configuration terminals of a programmable logic device in the remote device;
    automatically opening the path in the remote device after the programmable logic device is configured; and
    transporting the communication signal via a second path to one or more communication terminals of the programmable logic device.

11. The method of claim 10, further comprising: re-establishing the path only if the remote device is powered down or reset.

12. The method of claim 10, further comprising: re-establishing the path upon receiving a predetermined configuration command.

13. The method of claim 10, wherein the second path is established only after the programmable logic device is configured.

14. The method of claim 10, further comprising:
    providing a second path for the communication signal to one or more configuration terminals of a second programmable logic device in the remote device; and
    automatically opening the second path in the remote device after the second programmable logic device is configured.

15. The method of claim 14, wherein the second path is established only after the first programmable logic device is configured.

16. The method of claim 10, further comprising:
    measuring characteristics of a fluid flow; and
    communicating measurement data across a boundary of a hazardous environment.

17. A system for performing measurements in a hazardous environment, the system comprising:
    a main device isolated from the hazardous environment;
    a remote device located within the hazardous environment; and
    a communications link that transports at least one communication signal between the main device and the remote device,
    wherein the main device uses the communication signal to configure a programmable logic device in the remote device; and
    wherein after the programmable logic device is configured the main device and programmable logic device both employ the communication signal to communicate in accordance with a predetermined communications protocol.

18. The system of claim 17, wherein the communications link is a conductor having multiple electrical conductors.

19. The system of claim 17, wherein the remote device further includes a switch that passes the communication signal to a configuration terminal of the programmable logic device before the programmable logic device is configured, and wherein the switch automatically blocks the communication signal from the configuration terminal after the programmable logic device is configured.

20. The system of claim 17, wherein the main device resets and reconfigures the remote device after detecting incorrect operation of the remote device.

21. The system of claim 17, wherein the remote device is configured to measure or more characteristics of a fluid flow.

* * * * *